US008845150B2

(12) United States Patent

Brutsche et al.

(10) Patent No.: US 8,845,150 B2

(45) Date of Patent: Sep. 30, 2014

(54) MOVING LIGHT WITH FOLLOW SPOT

(75) Inventors: Rusty Brutsche, Dallas, TX (US); James Bornhorst, Dallas, TX (US); Steve Washington, Dallas, TX (US); Russell Mahaffey, Dallas, TX (US); David Friedersdorff, Dallas, TX (US); Ted Samuelson, Dallas, TX (US)

(73) Assignee: Production Resource Group LLC, New Windsor, NY (US)

( * ) Notice: Subject to any disclaimer, the term of this patent is extended or adjusted under 35 U.S.C. 154(b) by 757 days.

(21) Appl. No.: 12/959,095

(22) Filed: Dec. 2, 2010

(65) Prior Publication Data

US 2011/0164428 A1 Jul. 7, 2011

Related U.S. Application Data

(60) Provisional application No. 61/266,698, filed on Dec. 4, 2009.

(51) Int. Cl.

*F21S 8/00* (2006.01)
*B60Q 1/06* (2006.01)
*F21V 21/15* (2006.01)
*F21V 21/40* (2006.01)
*F21V 21/30* (2006.01)
*F21V 23/04* (2006.01)
*F21W 131/406* (2006.01)

(52) U.S. Cl.

CPC ................. *F21V 21/15* (2013.01); *F21V 21/40* (2013.01); *F21V 21/30* (2013.01); *F21V 23/0435* (2013.01); *F21W 2131/406* (2013.01)

USPC ........... 362/428; 362/370; 362/371; 362/372; 362/418; 362/419; 362/426; 362/427

(58) Field of Classification Search

CPC .................. F21W 2131/406; F21W 2131/407; F21V 21/14; F21V 21/15; F21V 21/26; F21V 21/40

USPC .......... 362/368, 370–372, 418–419, 426–428

See application file for complete search history.

(56) References Cited

U.S. PATENT DOCUMENTS 4,135,231 A * 1/1979 Fisher ........................... 362/269
4,316,237 A * 2/1982 Yamada et al. ................. 362/33
2004/0165385 A1* 8/2004 Belliveau ...................... 362/272
2010/0157602 A1* 6/2010 Nichols ......................... 362/277

FOREIGN PATENT DOCUMENTS

DK 2009-002 6/2009

* cited by examiner

*Primary Examiner* — Sean Gramling

(74) *Attorney, Agent, or Firm* — Law Office of Scott C. Harris, Inc.

(57) ABSTRACT

A luminaire that has multiple removable handles thereon, and can operate in multiple different modes, including a mode where a manual follow spot can occur. To operate in the manual follow spot mode, the luminaire is placed into a free moving mode in which it can be moved, and then the luminaire is moved using the removable handles to manually place the luminaire in a desired location. Then, the luminaire is commanded to remain in that desired location by turning on breaks or the like. In the manual movement mode, movement of the luminaire is manually controlled and not remotely controlled and all of at least color, gobo, beam size and other parameters are remotely controlled.

26 Claims, 4 Drawing Sheets

Pan/Tilt Screen

MOVING LIGHT WITH FOLLOW SPOT

This application claims priority from provisional application No. 61/266,698, filed Dec. 4, 2009, the entire contents of which are herewith incorporated by reference.

BACKGROUND

Stage lights are often used in entertainment venues.

Stage lights use very high intensity bulbs, for example 500 to 1500 W, and also have electronics therein to control their effects. All of this is housed within a housing.

A commonly used stage light is a moving light, which is typically a luminaire that is remotely controlled to move in pan and tilt directions based on a desired location of pointing. For example, this may be used to follow a performer on a stage, where as the performer moves, the luminaire pans and tilts in order to follow the performer's movement. Remote control of motors in the luminaire control the pan and tilt operation.

SUMMARY

The present application describes a moving light which has both automated pan and tilt capabilities and also allows operating in a follow spot mode in which the users such as a stage hand can manually move the pointing location of the luminaire. In the follow spot mode, however, all the automated functions of the luminaire can still be used, even though the luminaire is in manual mode. For example, this allows remote control of a light effect: e.g., a light output, color or gobo or other, even though the pointing of the light becomes done manually.

DETAILED DESCRIPTION

Moving lights typically operate in pan and tilt mode where they are commanded according to a remote command, such as over a DMX control, to move to a desired location. Motors control the housing of the moving light, also called a luminaire, to move between the different positions. Once at the desired position, there are typically brakes that are engaged so that the light stays exactly where it is pointed, rather than drifting from that location.

In an embodiment, the lamp in the luminaire can be one or more high intensity bulbs which project, or the luminaire can use emitting type lamps such as LED or fluorescent, or any other light source.

According to an embodiment, a moving light/luminaire can also be used as a manual follow spot. The luminaire has locations where it can be modified by attaching handles, and selecting an "enable pan/tilt free mode". In that enable/free mode, the user can control the luminaire to have a freely movable mode, and to move the housing of the luminaire manually to point at a desired location. In the freely movable mode, the pan/tilt motors, and pan/tilt brakes are disengaged and the device can be manually aimed. Brakes can also be manually reinitiated once manually pointed, so that once pointed in the right location, the luminaire can be held in that location.

In the follow spot mode, however, all the automated functions of the luminaire can still be used, even though the luminaire is in manual mode. For example, this allows remote control of a light effect: e.g., a light output, color or gobo or other, even though the pointing of the light becomes done manually. When the luminaire is in the manually attended follow spot mode, with pan and tilt disabled, that all other automatic functions of the light are still functional and controlled by the console and its operator. This is a major feature, since all of the color, gobo, beam size and other parameters are synchronized with the rest of the lighting system, thereby eliminating any errors or delays introduced by the manual operator. The manual operation occurs on the pointing only, with other features of the luminaire still being remotely controlled.

When "free" mode is turned off, the device can again be remotely controlled to remotely-commanded pan and tilt directions by remotely controlling the motors.

Throughout this description, the entire machine that is used to create the light and move is referred to as a "luminaire". The bulb which actually emits the light is referred to as a "lamp".

Figure 1:
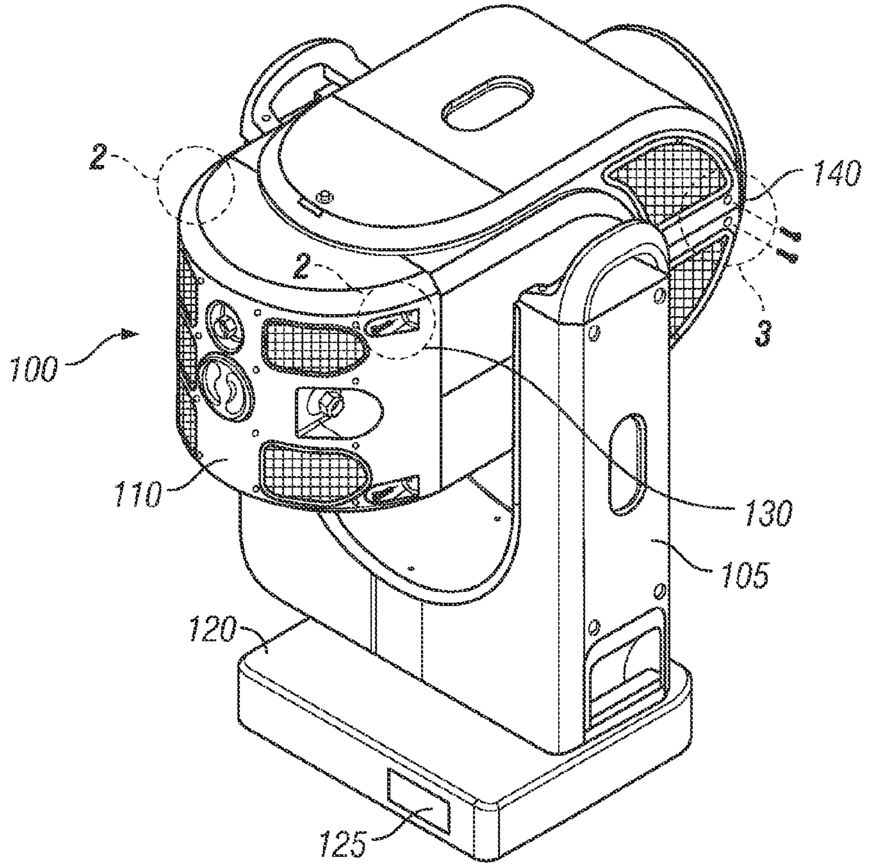
FIG. 1 shows diagram of the luminaire, and different parts of the luminaire including handle location.

FIG. 1 illustrates the moving luminaire with the manual handles. The assembly 100 includes a yoke portion 105 and a head portion 110 moves relative to the yoke. There can be motors within the yoke and/or head that move the yoke and/or head. In one embodiment, the head may move in the up-and-down direction in FIG. 1, the so-called pan direction, using motors in the head.

The yoke may swivel in the side to side direction in FIG. 1 relative to a base 120 that is either attached to a stage floor or to an overhead truss. The yoke movement from side to side may be considered "tilt" in the embodiment.

When the moving head is going to be remotely controlled, it is provided in the configuration shown in FIG. 1, that is without any handles or the like. However, the moving head includes mounts for multiple different handles that facilitate the use of this device with one or more removable handles.

Figure 2:
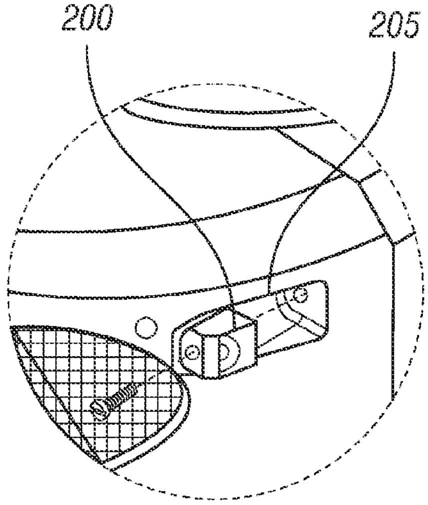
FIGS. 2 and 3 show detailed close-ups of different handle locations and brackets.

The mount area 130, shown in further detail in FIG. 2, is a rear handle mount, that provides a location to which the handle can attach. This may provide one side of the handle attachment, with the other side being attached at 135.

Figure 3:
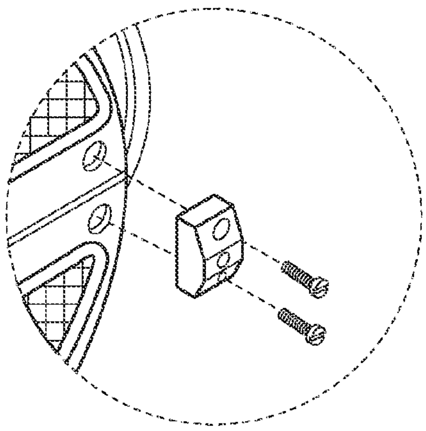
Figure 4:
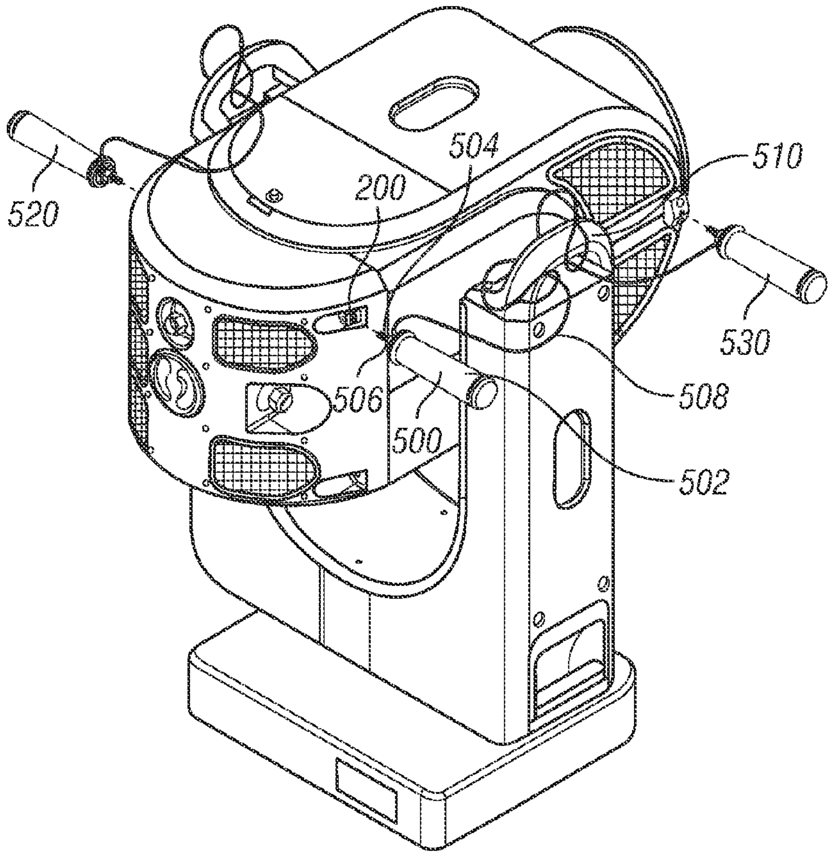
FIG. 4 illustrates the connection of the handles to the lamp body.

The attachment 140 may provide an attachment for a front handle mount. FIG. 3 shows more detail about the area 140, including the removable mount, also shown in more detail in FIG. 8.

The follow spot handles 502, 520, 530 may be substantially cylindrical handles as shown in FIGS. 4 and 7-9, that screw into the handle mount such as 200. Handle 500 screws into the handle mount 200. Since the handle is substantially cylindrical, it can be easily attached without leaving any extra space for the attachment. That is, the cylindrical handle can be rotated to screw into the handle mount 500, with the rotation not requiring any additional space other than that for the handle itself.

The handle itself 500 includes the cylindrical knob 502, and a screw portion 504 at the end of the cylindrical knob. The handle also includes a cable attachment 506 that attaches to a safety cable 508. The safety cable may, in operation, loop around the yoke handle 510 in this embodiment, the yoke handle 510 is integral with the yoke, and extends beyond a distal surface of the yoke, making a substantially half cylinder shaped area at the end of the yoke. However, the safety cable can loop around other parts in other embodiments. For example, in an alternative embodiment, the safety cable may be looped around any part of luminaire housing.

The inventors have found that it is important to have a safety cable attached to these handles, since these handles are intended to be removed from the luminaires and could come loose. Often, the luminaires are on trusses, above the stage, for example 20 to 100 feet above the stage. Since the handles are removable, the handle could fall if not permanently attached to the luminaire. However, the safety cables may be attached via loops, so that the handles can be removed when the luminaire is not going to be used for manual operation.

In a similar way, handle 520 may be on the other side of the back of the luminaire, on the other side from the handle 502. Handle 530 may be on one side in the front of the luminaire, without there being a corresponding handle on the other side of the front of the luminaire. The use of these three handles allows moving the follow spot in any of the pan and tilt directions using any two of the three handles. A first pair of handles 500, 530 can be used to move in the pan direction, for example, and a different pair of handles 500, 520 that can be used to move in the tilt direction. One of the handles, here 500, is used for both moving in the pan direction and in the tilt direction.

In one embodiment, the luminaire has an internal processor, and there is a control screen which can be seen and may be controlled from a touchscreen controller 125 on the base 120. Different functions of the luminaire can be locally controlled from that screen. One possible menu is the pan and tilt menu, and users can advance through the different possible menus to get to any of these menu.

Figure 5:
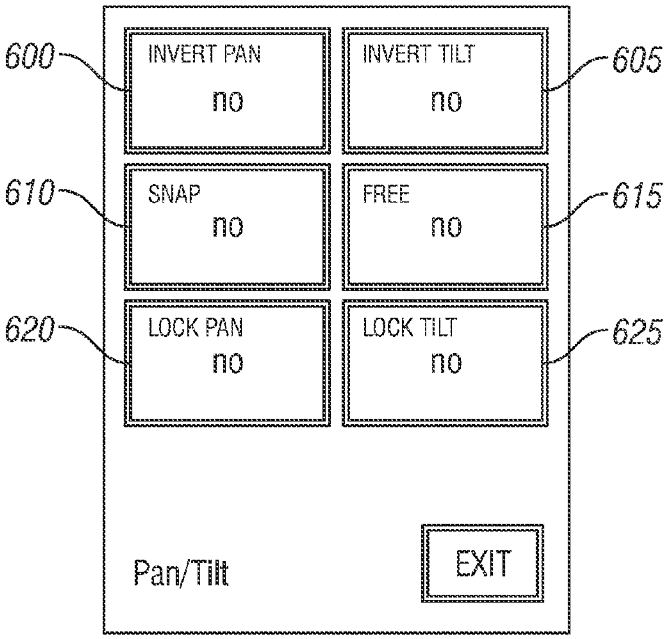
FIG. 5 shows a menu that controls operation of allowing the luminaire to operate in its different modes.

The pan and tilt menu is shown in FIG. 5. The different options available in pan and tilt mode include whether the pan is inverted at 600 and whether tilt is inverted at 605. This inverts the signal that is received, which might be used when the light has been mounted upside down. Swap may swap pan and tilt. Free mode at 615 disconnects the brakes and the motors so that the lamp can be freely moved using the handles as described above. The opposite of free mode is the lock mode, where pan can be locked at 620 and tilt can be locked at 625. This lock mode can be used, for example, after the handles have been used to properly configure the pointing of the lamp to the proper location.

As described above, in the follow spot mode, all the automated functions of the luminaire can still be used, even though the luminaire is in manual mode. For example, this allows remote control of a light effect with manual control over the light pointing.

As an alternative, these controls can be operated using any of the control channels, for example this can be done using DMX channels.

Figure 6:
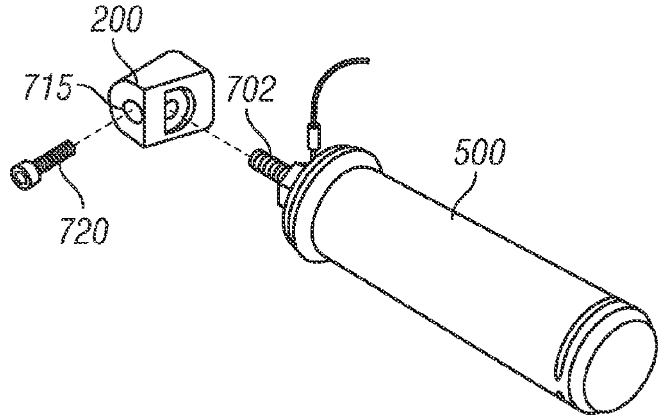
FIGS. 6-9 show exploded views of different handles and brackets and how they attach to the luminaire housing.
Figure 7:
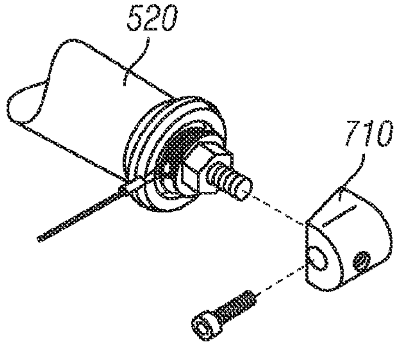

Further detail of the handle and the mounts is shown in FIGS. 6-9. FIG. 6 shows the mount 200, and the handle 500 attached to the mount 200 via a screw portion 702 at the end. In a similar way, the handle 520 is shown attached attaching to a corresponding mount 710 in FIG. 7. Each mount may include a screw opening such as 715 which receives a screw 720 that holds the mount into the housing of the luminaire.

Figure 8:
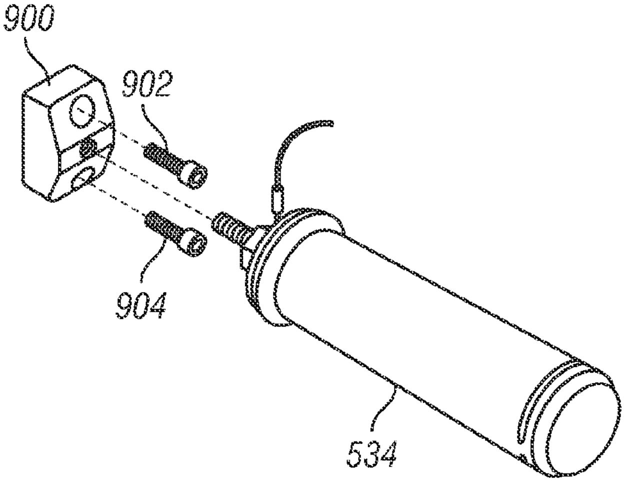
Figure 9:
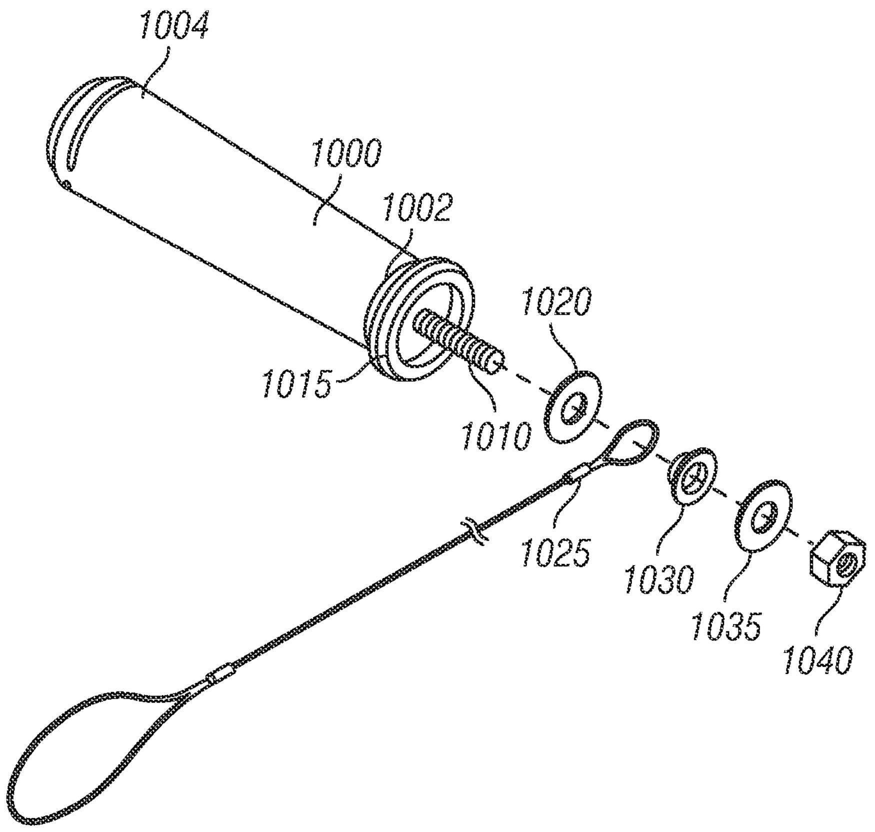

FIG. 8 shows the front handle 530, and the corresponding mount 900. Note that the mount 900 is surface mounted using two screws 902, 904. In this embodiment, the front mount in this embodiment may be surface mounted, while the two rear mounts are mounted in indentations within the housing for example the indentation 205 shown in FIG. 2. All of the handles may be the same configuration, however.

FIG. 10 shows an exploded view of the handle including the substantially cylindrical part 1000 which is slightly narrower at the front end closer to the screw 1002 than it is at its rear end 1004. The screw 1010 is screwed into one of the ends of the handle. The handle also includes a stop flange 1015 which forms a surface that presses against the luminaire housing when the handle is completely screwed in. In the embodiment, the screw receives a first washer 1020, and then the loop portion of the safety cable 1025. A bearing flange 1030 holds the safety cable, which is covered by another washer 1035 and the nut 1040.

The luminaire may be operated by a computer, both inside the luminaire and external to the luminaire. The computer may include a processor that operates to accept user commands, execute instructions and produce output based on those instructions. The processor is preferably connected to a communication bus. The communication bus may include a data channel for facilitating information transfer between storage and other peripheral components of the computer system. The communication bus further may provide a set of signals used for communication with the processor, including a data bus, address bus, and/or control bus.

The computer may operate as described above. A storage medium provides storage of instructions and data for programs executing on a processor.

At least one possible storage medium is preferably a computer readable medium having stored thereon computer executable code (i.e., software) and/or data thereon in a non-transitory form. The computer software or data stored on the removable storage medium is read into the computer system as electrical communication signals.

The computer system may also include a communication interface. The communication interface allows' software and data to be transferred between computer system and external devices (e.g. printers), networks, or information sources. For example, computer software or executable code may be transferred to the computer to allow the computer to carry out the functions and operations described herein. The computer system can be a network-connected server with a communication interface. The communication interface may be a wired network card, or a Wireless, e.g., Wifi network card.

Software and data transferred via the communication interface are generally in the form of electrical communication signals.

Computer executable code (i.e., computer programs or software) are stored in the memory and/or received via communication interface and executed as received. The code can be compiled code or interpreted code or website code, or any other kind of code.

A "computer readable medium" can be any media used to provide computer executable code (e.g., software and computer programs and website pages), e.g., hard drive, USB drive or other. The software, when executed by the processor, preferably causes the processor to perform the inventive features and functions previously described herein.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A stage lighting luminaire, comprising:

a mount, for mounting a stage lighting luminaire to a support; a yoke, attached to said mount, and enabling moving the luminaire in a first direction;

a luminaire head, movably attached to said yoke, and enabling moving a direction of said luminaire in a second direction, which is different than said first direction; a controller for said luminaire, said controller defining a first mode in which the luminaire is remotely controllable to move in at least one of said first and second directions according to an applied remote command, and defining a second mode, in which the luminaire is movable freely in said first direction; and plural removable handle mounts on said luminaire head, each of said handle mounts enabling connection of a removable handle thereto.

2. A luminaire as in claim 1, wherein there are three of said handle mounts.

3. A luminaire as in claim 2, wherein two of said handle mounts are in the back of the luminaire, on an opposite to the side to a side on which a light output occurs, and, and a third of said handle mounts is in the front, on the side where the light output occurs.

4. A luminaire as in claim 1, wherein said handle mounts attach via a screw into said luminaire head.

5. A luminaire as in claim 1, wherein a first said handle mounts are recessed into and below an outer surface of a housing of the luminaire, and at least one of said handle mounts extends above the outer surface of the housing of the luminaire.

6. A luminaire as in claim 1, further comprising a handle which screws into said luminaire, wherein said handle is substantially radially symmetrical, and screws into a single threaded screw.

7. A luminaire as in claim 6, further comprising a safety cable, attached to said handle, said safety cable being attachable to said luminaire.

8. A luminaire as in claim 6, further comprising additional first and second handles, and mounted on said yoke.

9. A luminaire as in claim 1, wherein in said second mode, each of a plurality of automated functions of the luminaire can still be remotely controlled.

10. A stage lighting luminaire assembly, comprising:

a luminaire, including a light emitting part, and a mount, for mounting to a support, said luminaire having moving parts, enabling moving in pan and tilt direction, to change a direction of light being emitted from the light emitting part;

said luminaire having a first permanently attached handle that is permanently attached thereto;

a first removable handle, that is attachable to and removable from said luminaire, said first removable handle having a safety line attached thereto, said safety line attachable to said first permanently attached handle; and second and third removable handles, where said first and second removable handles are at a rear of the luminaire and said third handle is at one side of the front of the luminaire.

11. An assembly as in claim 10, wherein said second and third removable handles each have safety lines attached thereto.

12. An assembly as in claim 10, further comprising a second permanently attached handle at an opposite side of the luminaire from said first permanently attached handle.

13. An assembly as in claim 10, wherein said luminaire includes a mount, mounting said luminaire to a support;

a yoke, attached to said mount, and enabling moving said luminaire in a first direction; and a luminaire head, movably attached to said yoke, and enabling moving a direction of said luminaire in a second direction, which is different than said first direction.

14. An assembly as in claim 13, wherein said permanently attached handle is attached to said yoke, and said removable handle is attached to said luminaire head.

15. A stage lighting luminaire assembly, comprising:

a luminaire, including a light emitting part, and a mount, for mounting to a support, said luminaire having moving parts, enabling moving in pan and tilt direction, to change a direction of light being emitted from the light emitting part;

said luminaire having a first permanently attached handle that is permanently attached thereto;

a first removable handle, that is attachable to and removable from said luminaire, said first removable handle having a safety line attached thereto, said safety line attachable to said first permanently attached handle; and multiple handle mounts on said removable handles, wherein a first of said handle mounts are recessed into and below an outer surface of a housing of the luminaire, and at least one of said handle mounts extends above the outer surface of the housing of the luminaire.

16. A luminaire as in claim 15, further comprising a handle which screws into said luminaire, wherein said handle is substantially radially symmetrical, and screws into a single threaded screw.

17. An assembly as in claim 15, further comprising a controller that controls said luminaire in a first mode to move in said pan and tilt directions based on an applied command using at least one motor in said luminaire, and which controls said luminaire and a second mode to allow manual movement in pan and tilt directions using said removable handles.

18. A luminaire as in claim 17, wherein in said second mode, each of a plurality of automated functions of the luminaire can still be remotely controlled.

19. A stage lighting luminaire assembly, comprising:

a luminaire, formed of:

a first part that includes a mount, mounting said luminaire to a support;

a second part, attached to said mount, and enabling moving said luminaire in a panning direction; and a third part, movably attached to said second part, and enabling moving a direction of said luminaire in a tilting direction, said third part including a light emitting part;

a first permanently attached handle that is permanently attached to one of said parts of said luminaire;

a first removable handle, that is attachable to and removable from a different of said parts of said luminaire than said one of said parts of said luminaire, and second and third removable handles, where said first and second removable handles are at a rear of the luminaire and said third handle is at one side of a front of the luminaire.

20. An assembly as in claim 19, further comprising a safety line attached to said first removable handle, said safety line attachable to said first permanently attached handle.

21. An assembly as in claim 19, wherein said second and third removable handles each have safety lines attached thereto.

22. An assembly as in claim 19, further comprising a second permanently attached handle at an opposite side of the luminaire from said first permanently attached handle.

23. An assembly as in claim 19, further comprising a controller that controls said luminaire in a first mode to move in said pan and tilt directions based on an applied command using at least one motor in said luminaire, and which controls said luminaire and a second mode to allow manual movement in pan and tilt directions using said removable handles.

24. An assembly as in claim 23, wherein in said second mode, each of a plurality of automated functions of the luminaire can still be remotely controlled.

25. An assembly as in claim 19, wherein said second part is a yoke.

26. An assembly as in claim 25, wherein said permanently attached handle is attached to said yoke, and said removable handle is attached to said third part.

* * * * *